United States Patent
Imai (10) Patent No.: US 8,711,445 B2
(45) Date of Patent: Apr. 29, 2014

(54) READING APPARATUS AND READING METHOD

(75) Inventor: Toshie Imai, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 114 days.

(21) Appl. No.: 13/426,126

(22) Filed: Mar. 21, 2012

(65) Prior Publication Data

US 2012/0243061 A1    Sep. 27, 2012

(30) Foreign Application Priority Data

Mar. 22, 2011    (JP) ................................ 2011-062773

(51) Int. Cl.
*H04N 1/04*    (2006.01)
(52) U.S. Cl.
USPC ............ 358/475; 358/474; 358/498; 358/497
(58) Field of Classification Search
USPC .......................... 358/475, 474, 498, 497, 496
See application file for complete search history.

(56) References Cited

U.S. PATENT DOCUMENTS

| | | | |
|---|---|---|---|
| 7,001,024 B2* | 2/2006 | Kitaguchi et al. | 353/70 |
| 7,038,228 B2* | 5/2006 | Hasegawa et al. | 250/556 |
| 7,750,330 B2* | 7/2010 | Murata | 250/559.4 |
| 2002/0018249 A1* | 2/2002 | Yamakawa et al. | 358/475 |
| 2005/0281596 A1* | 12/2005 | Nakagawa et al. | 399/350 |
| 2010/0055424 A1 | 3/2010 | Yoshida et al. | |

FOREIGN PATENT DOCUMENTS

JP    2010-052247 A    3/2010

* cited by examiner

*Primary Examiner* — Houshang Safaipour
(74) *Attorney, Agent, or Firm* — Nutter McClennen & Fish LLP; John J. Penny, Jr.; Michael P. Visconti, III (57) ABSTRACT

Provided is a reading apparatus that includes a light source that emits a light to a source material and an image pickup element that receives the light reflected by the source material, to thereby read the source material. The image pickup element is disposed so as to move to a plurality of positions at each of which the image pickup element is oriented at a different angle with respect to a surface to be read of the object to be read, and to perform reading at the plurality of positions. The reading apparatus compares read values obtained by the image pickup element at the plurality of positions to thereby decide a property of an image expressed on the object to be read.

7 Claims, 7 Drawing Sheets

READING APPARATUS AND READING METHOD

BACKGROUND

1. Technical Field

The present invention relates to a reading apparatus and a reading method.

2. Related Art

A scanner for reading an image is configured so as to emit a light from a light source to a source material while moving an image pickup element relatively to the source material, and receiving the reflected light from the source material at the image pickup element, thereby reading the image expressed on the source material. The image pickup element is generally mounted so as to receive the reflected light at a certain fixed angle, specifically at 45 degrees with respect to an optical path of the light incident on the source material from the light source.

Examples of the source material to be read by the scanner include source materials with matt appearance, those with glossy appearance, those with metallic texture, and so forth. Examples of the glossy source material include photos printed on photo paper, and source materials printed with a clear ink for forming a gloss layer on a paper sheet. Examples of the source material with metallic texture include those printed with a metallic ink containing a metallic pigment. The metallic ink serves to provide a metallic texture to the finish of the printed material (see, for example, JP-A-2010-52247). Such a texture obtained from the metallic ink (metallic texture) may be considered as a kind of gloss, so to say an especial gloss.

Now, in the case of reading a glossy source material or a source material with metallic texture, the mounting angle of the image pickup element may constitute an issue, i.e., may affect the reading result. This is because an amount of light reflected by a glossy source material or source material with metallic texture is not uniform but differs depending on the reflection angle. Accordingly, reading the glossy or metallic source material with the image pickup element mounted at a fixed angle may result in failure to accurately read the feature of the source material, and consequently the image data generated on the basis of the read image may fail to enable accurately reproduction of the image expressed on the source material. In addition, when the image data thus generated is subjected to printing (when the source material is copied), the feature of the source material cannot be not precisely reproduced on the copy, in other words the glossy appearance or metallic texture is not reproduced on the copy although the source material has glossy appearance or metallic texture.

SUMMARY

An advantage of some aspects of the invention is that a technique for reading a source material from a plurality of angles is provided. Another advantage is that a technique is provided that enables accurate information of the source material, including the special feature thereof, to be acquired upon reading the source material.

In an aspect, the invention provides a reading apparatus that includes a light source that emits a light to an object to be read and an image pickup element that receives the light reflected by the object to be read, to thereby read the object to be read. The image pickup element is disposed so as to move to a plurality of positions at each of which the image pickup element is oriented at a different angle with respect to a surface to be read of the object to be read, and to perform reading at the plurality of positions.

In the thus-configured reading apparatus, the image pickup element is disposed so as to move to a plurality of positions at each of which the image pickup element is oriented at a different angle with respect to a surface to be read of the object to be read, and can therefore read the object to be read at the respective angles. In addition, each of the light beams reflected at different angles by the object to be read can be captured, and therefore information necessary for accurately reading the object to be read can be properly acquired.

Preferably, the reading apparatus may include a decision unit that compares read values obtained by the image pickup element at the plurality of positions to thereby decide a property of an image on the object to be read.

With such a configuration, a feature or property of the image expressed on the object to be read can be defined.

Preferably, the decision unit may decide the property of the image with respect to each of regions in the image.

Such an arrangement allows not only the property of the overall image of the object to be read, but also the property of each individual region of the image to be defined. The term "region" herein referred to means a part of the image, which may be formed of a plurality of pixels or of each single pixel.

Preferably, the decision unit may add information indicating a result of the decision to the image data generated by the image pickup element upon reading the object to be read.

In this case, the information indicating the property of the image (or each region of the image) is added to the image data generated upon reading the object to be read. Accordingly, the added information can be looked up when data is outputted on the basis of the image data (for example, when the image is printed), so that the image representing the object to be read can be precisely reproduced.

Preferably, the decision unit may decide that the image is presenting a glossy appearance in the case where a read value acquired from the image pickup element at a specific position corresponding to a specific angle among the plurality of positions is prominently higher than read values of the positions other than the specific position, and a difference between the read values of the positions other than the specific position is within a predetermined range.

With such an arrangement, it can be decided whether the image (or each region thereof), corresponding to the object to be read, is presenting a glossy appearance. In addition, in the case where the image is decided to be presenting a glossy appearance, such a decision result is added to the image data when data is outputted on the basis of the image data (for example, when the image is printed), so that the image presenting the glossy appearance can be precisely reproduced.

Preferably, the decision unit may decide that the image is expressing a metallic texture in the case where a read value acquired from the image pickup element at a specific position corresponding to a specific angle among the plurality of positions is prominently higher than read values of the positions other than the specific position, and the read values of the positions other than the specific position vary in a predetermined variation pattern.

With such an arrangement, it can be decided whether the image (or each region thereof), corresponding to the object to be read, is expressing a metallic texture. In addition, in the case where the image is decided to be expressing a metallic texture, such a decision result is added to the image data when data is outputted on the basis of the image data (for example, when the image is printed), so that the image expressing the metallic texture can be precisely reproduced.

Preferably, the reading apparatus may be configured so as to execute prescanning and regular scanning of the object to be read, and the prescanning may include reading the object to be read with the image pickup element at one or more positions among the plurality of positions, to thereby decide whether to read the object to be read at all of the plurality of positions on the basis of a reading result obtained at the one or more positions; and the regular scanning may include reading the object to be read with the image pickup element at all of the plurality of positions in the case where it is decided to read the object to be read at all of the plurality of positions, and reading the object to be read with the image pickup element at one of the plurality of positions in the case where it is not decided to read the object to be read at all of the plurality of positions.

In this case, the reading apparatus decides whether it is necessary to read the object to be read at all of the plurality of positions on the basis of a reading result obtained by reading, in the prescanning, the object to be read with the image pickup element at one of the plurality of positions, and reads, in the regular scanning, the object to be read with the image pickup element at all of the plurality of positions only when it is decided to be necessary to do so. Such an arrangement prevents an increase in processing time originating from moving the image pickup element to different positions and in amount of processing jobs because of the increase in the number of reading angles.

Preferably, the reading apparatus may include a warning unit that performs a predetermined warning operation in the case where a difference between the read values exceeds a predetermined amount as a result of the comparison.

Such a configuration enables the user to be warned of an object to be read that may fail to be accurately read, thereby allowing the user to take a necessary action.

The technical idea according to the invention may be realized in various forms in addition to the category of the reading apparatus. For example, a method of reading performed by a reading apparatus can be conceived, the reading apparatus including a light source that emits a light to an object to be read and an image pickup element that each receive the light reflected by the object to be read to thereby read the object to be read, in which the image pickup element moves to a plurality of positions at each of which the image pickup element is oriented at a different angle with respect to a surface to be read of the object to be read, and to perform reading at the plurality of positions. Further, a program can be conceived that causes the reading apparatus to perform reading by moving the image pickup element to the plurality of positions of different angles. The reading apparatus may be a single-function independent unit such as a scanner, or a multifunction apparatus having a part or whole of the functions of a printer, a copier, a facsimile machine, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, an embodiment of the invention will be described referring to the drawings.

1. Configuration of Apparatus

Figure 1:
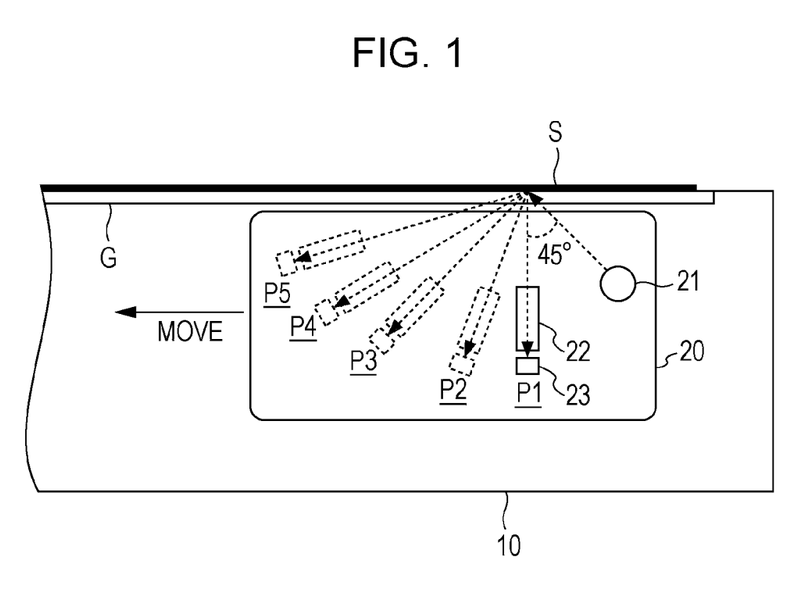
FIG. 1 is a schematic side view showing a part of a reading apparatus according to the invention.

FIG. 1 is a schematic side view showing a part of a reading apparatus 10 according to the embodiment of the invention. The reading apparatus 10 includes a source material table G formed of glass or the like, on which a source material S, corresponding to the object to be read, is placed. The upper face of the source material S is covered with a lid which is not shown. Inside a casing of the reading apparatus 10, an image pickup unit 20 is provided under the source material table G. The image pickup unit 20 includes a light source 21 and an image pickup element 23. The light source 21 is for example an LED, and emits a light to the source material S. The image pickup element 23 is movable to a plurality of positions inside the image pickup unit 20, and receives a reflected light from the source material S at each of the plurality of positions, to thereby read the source material S. A lens 22 is disposed between the image pickup element 23 and the source material table G, and the lens 22 moves together with the image pickup element 23 in the image pickup unit 20. Hereafter, it is to be understood that the movement of the image pickup element 23 is accompanied by the lens 22, though it is not stated each time. The image pickup element 23 receives the light condensed by the lens 22.

The image pickup element 23 is, for example, a linear sensor in which a plurality of pixels (photodetectors) are aligned in a widthwise direction (main scanning direction, i.e., depthwise direction in FIG. 1) of a reading range generally corresponding to the area of the source material table G, and performs photoelectric conversion of the light received by the photodetector and A/D conversion of the electrical signal, to thereby output a digital value (RGB value) of each pixel. As shown in FIG. 1, the image pickup element 23 is movable to the plurality of positions P1, P2, P3, P4, P5 in the image pickup unit 20, and a direction in which the image pickup element 23 is oriented at each of the positions P1, P2, P3, P4, P5 defines a different angles with respect to the surface to be read of the source material S (or the plane including the source material table G). In FIG. 1, the image pickup element 23 located at the position P1 is indicated by solid lines, and the image pickup element 23 displaced to the positions P2, P3, P4, P5 is indicated by broken lines. The position P1 will also be referred to as the initial position of the image pickup element 23. Hereafter, the movement of the image pickup element 23 will be construed as a change in location of the image pickup element 23 among the plurality of positions in the image pickup unit 20, unless otherwise noted.

The image pickup unit 20 can be moved by a drive mechanism 30 (see FIG. 2) parallel to the source material table G in a direction perpendicular to the main scanning direction of the source material table G (sub scanning direction). The drive mechanism 30 can also move the image pickup element 23 in the image pickup unit 20, for example along a curved rail (not shown) corresponding to the positions P1, P2, P3, P4, P5. The drive mechanism 30 may, for example, move the image pickup unit 20 in the sub scanning direction of the reading range with the image pickup element 23 retained at one of the positions in the image pickup unit 20, and repeat this action changing the position of the image pickup element 23. Alternatively, the drive mechanism 30 may stop the image pickup unit 20 at a predetermined position in the sub scanning direction (each position corresponding to the reading resolution in the sub scanning direction) and move the image pickup element 23 to the respective positions while the image pickup unit 20 is detained, and repeat this action each time the image pickup unit 20 is moved to a new position. Through such operations, the image pickup element 23 can read the entirety of the source material S from a plurality of angles.

In the configuration shown in FIG. 1, the position P1 of the image pickup element 23 closest to the light source 21 is located such that the direction in which the image pickup element 23 is oriented defines an angle of 45 degrees with respect to an incident path of the light from the light source 21 to the source material S, which is typically set at 45 degrees with respect to the source material S. The remaining positions P2, P3, P4, P5 are sequentially located farther from the light source 21, and hence a wider angle is defined between the incident path and the direction in which the image pickup element 23 farther from the light source 21 is oriented. In addition, a specific one of the plurality of positions P1, P2, P3, P4, P5 (position P3 in the example shown in FIG. 1) is located so as to allow the image pickup element 23 to receive the reflected light at the specular reflection angle with respect to the light source 21. In other words, the angle defined between the incident path and the source material S equals to the angle defined between the direction in which the image pickup element 23 is oriented at the specific position and the source material S.

Figure 2:
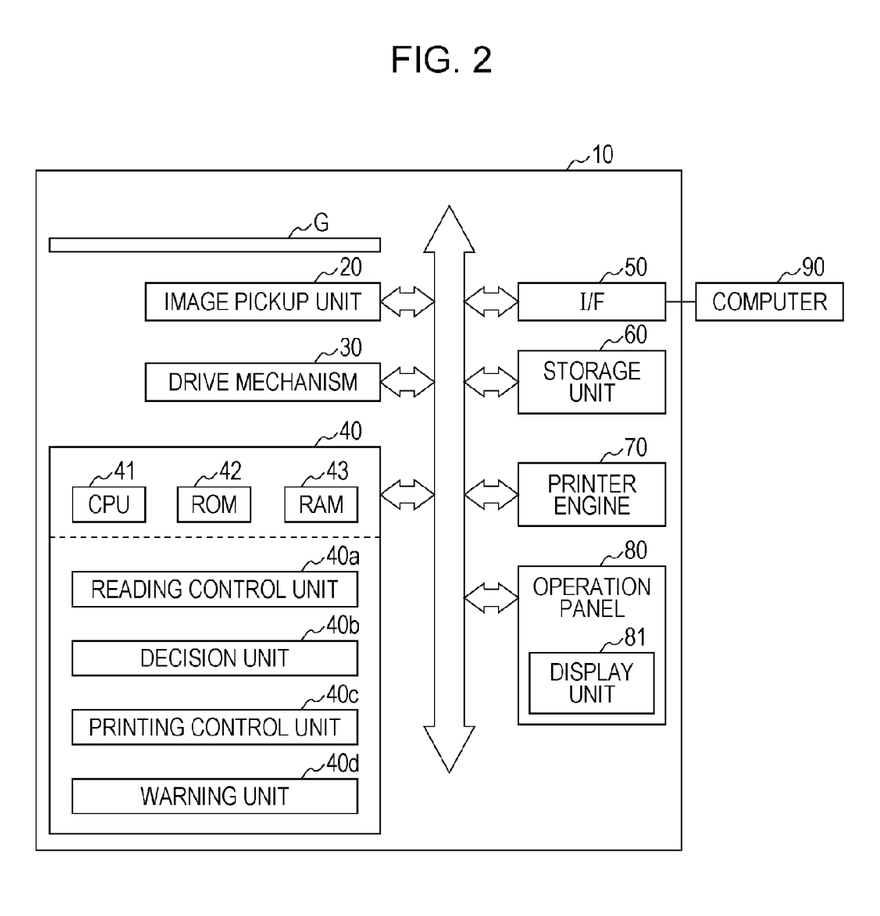
FIG. 2 is a block diagram showing a general configuration of the reading apparatus.

FIG. 2 is a block diagram showing a general configuration of the reading apparatus 10. In FIG. 2, the reading apparatus 10 is exemplified by a multifunction apparatus. The reading apparatus 10 includes a control unit 40 that controls the functional components of the reading apparatus 10. The control unit 40 includes a CPU 41, a ROM 42, a RAM 43 and so forth, so that the CPU 41 performs arithmetic operations in accordance with program data stored in the ROM 42 by using the RAM 43 as a work area, to thereby realize the functions of a reading control unit 40a, a decision unit 40b, a printing control unit 40c, and a warning unit 40d. The reading apparatus 10 also includes an interface (I/F) 50 for communication with an external apparatus. In the example shown in FIG. 2, the reading apparatus 10 is connected to a computer 90 through the I/F 50.

The reading apparatus 10 may further include a storage unit 60 constituted of a hard disk drive (HDD) or the like, a printer engine 70, and an operation panel 80. The printer engine 70 is a printing mechanism that performs printing on a printing medium in accordance with printing data generated by the printing control unit 40c. The operation panel 80 includes a display unit 81 composed of an LCD or the like, a touch panel provided over the display unit 81, and some keys and buttons. The operation panel 80 accepts instructions of a user through the touch panel, keys, and buttons, and displays necessary information on the display unit 81 as the case may be. The components of the reading apparatus 10 are connected to each other through a bus.

The reading control unit 40a controls the image pickup unit 20 and the drive mechanism 30 so as to cause the drive mechanism 30 to move the image pickup element 23 and the image pickup unit 20, and causes the image pickup element 23 to read the source material S, to thereby acquire read image data (data possessing the RGB values with respect to each pixel) representing the reading result of the source material S. The drive mechanism 30 includes a motor, a carriage and so forth employed for moving the image pickup element 23 and the image pickup unit 20. The printing control unit 40c generates printing data on the basis of the read image data outputted from the reading control unit 40a (step S230 in FIG. 3 to be subsequently described), and causes the printer engine 70 to perform printing in accordance with the printing data. In this process, the printing control unit 40c performs, with respect to the read image data, color conversion from an RGB colorimetric system to an ink colorimetric system, halftone processing with respect to the data obtained by the color conversion (ink amount data), rasterization of the halftone data and so forth, to thereby generate the printing data corresponding to the image expressed on the source material S.

The reading control unit 40a may store the read image data in the storage unit 60 or transmit the read image data to the computer 90 through the I/F 50. Alternatively, the reading apparatus 10 may be controlled by the computer 90 so as to be driven. More specifically, the reading apparatus 10 may read the source material S, perform printing (copying) of the read image data generated by the reading control unit 40a upon reading the source material S, or transmit the read image data to the computer 90, in accordance with a command transmitted from the computer 90 based on a scanner controlling program (driver) installed in the computer 90.

Although the reading apparatus 10 is configured so as to move the image pickup unit 20 with the source material S retained at a fixed position to thereby scan the entirety of the source material S, the source material S may be moved in the sub scanning direction with the image pickup unit 20 mounted at a fixed position.

Alternatively, the image pickup unit 20 may be formed in a smaller size in the main scanning direction, so as to be moved in the main scanning direction by a carriage. In this case, the entirety of the source material S can be scanned by repetitions of reading an image corresponding to one line of the source material by moving the image pickup element 23 to the respective positions while moving the image pickup unit 20 a plurality of times in the main scanning direction, and then moving the source material S (or image pickup unit 20) in the sub scanning direction, after reading one line, at a pitch corresponding to the reading resolution in the sub scanning direction.

Further, the number of positions at which the image pickup element 23 can be located in the image pickup unit 20 is not limited to five as shown in FIG. 1, but may be any number not fewer than two of different angles.

2. Reading Control Process

Figure 3:
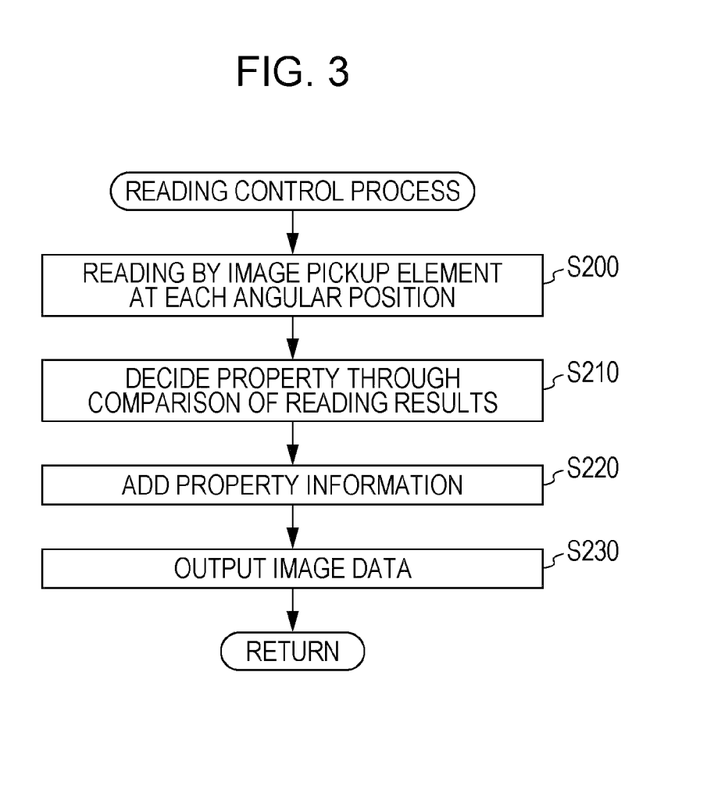
FIG. 3 is a flowchart showing a reading control process.

FIG. 3 is a flowchart showing a reading control process performed by the control unit 40. At a step S200, the reading control unit 40a controls the image pickup unit 20 and the drive mechanism 30 so as to cause the drive mechanism 30 to drive the image pickup element 23 and the image pickup unit 20, and causes the image pickup element 23 to read the source material S at the positions P1, P2, P3, P4, P5. Then the read image data acquired at the angles respectively corresponding to the positions P1, P2, P3, P4, P5 is outputted to the decision unit 40b.

At a step S210, the decision unit 40b compares the read image data acquired at the plurality of angles, to thereby decide the property of the image expressed on the source material S. In this process, the decision unit 40b compares the read image data from the image pickup element 23 acquired at the plurality of angles, with respect to values corresponding to the same pixel. The value for the comparison (read value) may be a specific value among RGB, or a value obtained by summing the values of RGB each weighted by a predetermined ratio (luminance). Thus, in the case where the image pickup element 23 is movable to five positions (five angles) as shown in FIG. 1, five read values are used for the comparison with respect to a pixel, at the step S210.

Figure 4A:
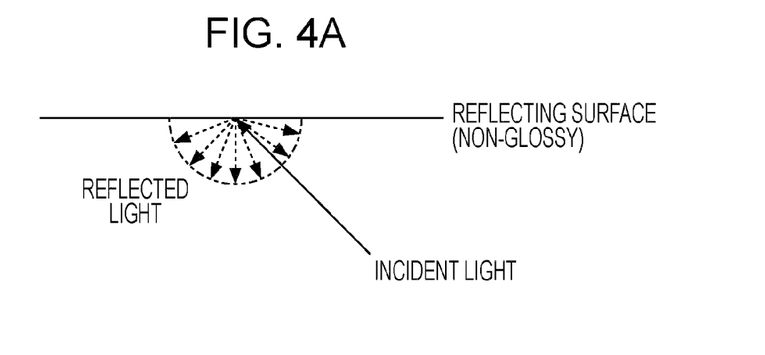
FIGS. 4A to 4C are diagrams showing reflections of light that differ depending on a feature of a reflecting surface.
Figure 4B:
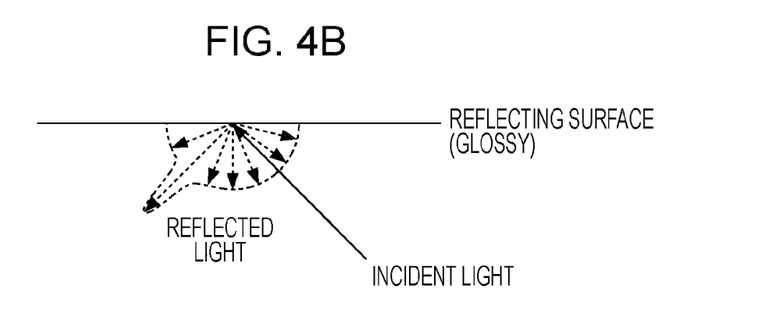
Figure 4C:
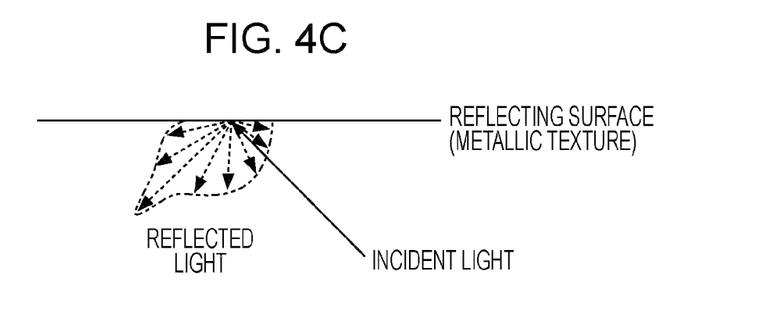

FIGS. 4A to 4C are diagrams showing reflections of light that differ depending on the feature of the reflecting surface of the source material S. In FIGS. 4A, to 4C, the optical path of incident light (incident angle: 45 degrees) is indicated by solid lines, and a part of the optical path of the reflected light is indicated by broken lines. As shown in FIG. 4A, in the case where the reflecting surface of the source material S is not presenting gloss nor especial gloss, i.e., is presenting a matt texture, the light reflected by such a surface possesses generally the same light amount in all reflecting directions. In contrast, as shown in FIG. 4B, in the case where the reflecting surface of the source material S is presenting gloss, but not the especial gloss, the light reflected by such a surface possesses an outstanding light amount at the specular reflection angle, but possesses generally the same light amount in the remaining reflecting directions. Further, as shown in FIG. 4C, in the case where the source material S is printed with a metallic ink and hence the surface thereof is presenting a metallic texture (especial gloss), the light reflected by such a surface possesses an outstanding light amount at the specular reflection angle, and the light amount gradually decreases from that at the specular reflection angle, in the remaining reflecting directions.

At the step S210, therefore, the decision unit 40*b* decides, upon comparing the read values of the plurality of angles with respect to a subject pixel, that the subject pixel is not presenting gloss nor especial gloss (property: non-glossy) in the case where a difference between the read values (difference between the maximum value and the minimum value among the read values of the respective angles) is within a predetermined numerical range.

In contrast, the decision unit 40*b* decides, upon comparing the read values of the plurality of angles with respect to a subject pixel, that the subject pixel is presenting gloss but not the especial gloss (property: glossy), in the case where the read value of the specific position (specular reflection angle) is outstandingly higher than the read values of the positions other than the specific position, and a difference between the read values of the positions other than the specific position (difference between the maximum value and the minimum value among the read values of the positions other than the specific position) is within the predetermined numerical range. Here, whether the read value of the specific position (specular reflection angle) is outstandingly higher than the read values of the positions other than the specific position may be decided, for example, on the basis of whether a difference between the read value of the specific position (specular reflection angle) and the maximum read value among those of the positions other than the specific position is greater than a predetermined differential value.

Further, the decision unit 40*b* decides, upon comparing the read values of the plurality of angles with respect to a subject pixel, that the subject pixel is presenting the especial gloss (property: metallic texture), in the case where the read value of the specific position (specular reflection angle) is outstandingly higher than the read values of the positions other than the specific position, and the read values of the respective positions present a predetermined variation pattern. Here, the decision unit 40*b* decides that the read values of the respective angles present the predetermined variation pattern in the case, for example, where the difference between the read values of the positions other than the specific position exceeds the predetermined numerical range, and the read value of a position other than the specific position is higher than that of an adjacent position on the opposite side of the specific position (position P1 when viewed from position P2, and position P5 when viewed from position P4).

The decision unit 40*b* performs such a decision of the property with respect to each pixel constituting the read image data.

At the step S220, the decision unit 40*b* adds, to the read image data, information indicating the property of the image (property information) decided at the step S210 with respect to each pixel. The read image data to which the property information is added is the data to be subjected to various processings subsequent to the reading control process that follows the reading by the image pickup unit 20 and, basically, the read image data of one of the plurality of positions is adopted. In this embodiment, the property information is to be added to the read image data of the angle of the initial position. For example, the decision unit 40*b* records the property information in the alpha channel of the read image data. The read image data contains, with respect to each pixel, information in RGB channels (for instance, each channel contains information of 8 bits=256 gradations), and also possesses another channel (alpha channel), in which the decision unit 40*b* records the property information about the relevant pixel. In other words, the decision unit 40*b* converts the read image data to which the property information is to be added to an image file of a predetermined format that includes the alpha channel, and records the property information in the alpha channel of each pixel. In this embodiment, the decision unit 40*b* records, at least with respect to pixels decided to have the property of "gloss" or "especial gloss", the property information that uniquely identifies such properties.

However, in the read image data to which the property information is added, the RGB channels of all the pixels do not always represent the read image data of the angle of the one of the positions (initial position). This is because, in the case of the source material with metallic texture in particular, such image data as barely expressing a hue and only representing white and black may sometimes be acquired as a result of reading, depending on the angle of the image pickup element that receives the reflected light. Accordingly, the decision unit 40*b* adopts the RGB values representing the highest chroma among those acquired as a result of reading at the positions P1, P2, P3, P4, P5 (RGB values maintaining a hue of the source material S), as the information of the RGB channel, with respect to the pixel having the property of "especial gloss". The evaluation method of chroma is not specifically limited. For example, the RGB values may be converted into L*a*b* values of a device-independent colorimetric system by using a predetermined colorimetric system conversion formula to thereby evaluate the chroma, or simply a difference between the maximum value and the minimum value among the elements of the RGB values may be regarded as chroma, for evaluation.

Figure 5:
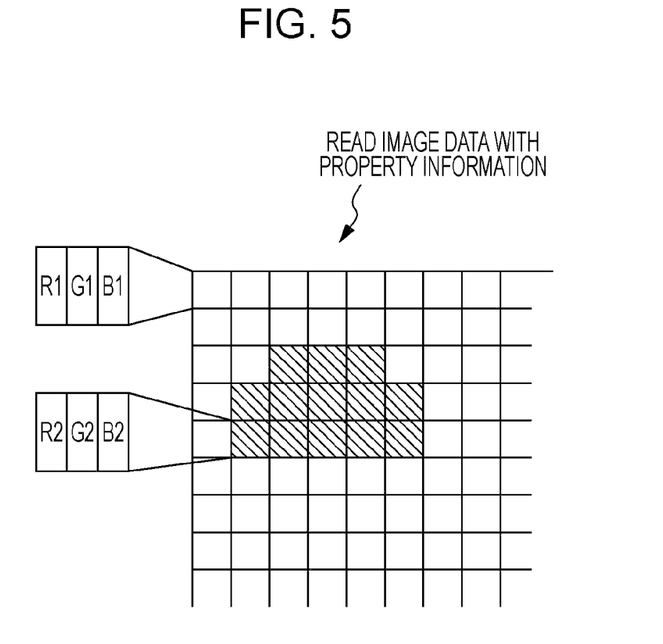
FIG. 5 is a schematic diagram showing a part of read image data.

FIG. 5 is a schematic diagram showing a part of the read image data obtained at the step S220. In FIG. 5, hatched pixels among a plurality of rectangular pixels are those bearing the property information of "especial gloss". In other words, since a partial region of the source material S to be read is printed with a metallic ink, the property information of "especial gloss" is recorded (in the alpha channel) in those pixels corresponding to that partial region, as a result of comparison of the read values of the positions P1, P2, P3, P4, P5. In FIG. 5, the RGB values (R1, G1, B1) read at the initial position are adopted as information of the RGB channels with respect to the pixels other than those in the partial region, however in the pixels in the partial region, the RGB values representing the highest chroma among those read at the positions P1, P2, P3, P4, P5 (for example, R2, G2, B2 read by the position P2) are adopted as the information of the RGB channels. In FIG. 5, however, the alpha channel is not illustrated.

At the step S230, the reading control unit 40a outputs the read image data (image file) bearing the property information, acquired through the steps up to S220. The term "output" herein refers to outputting to the printing control unit 40c, to the storage unit 60, and to the computer 90 through the I/F 50. In other words, the output destination of the read image data bearing the property information is determined by an instruction through the operation panel 80 or an instruction from the computer 90 (for example, instruction to copy the source material S, to store the scanning result in the reading apparatus 10, to store the scanning result in the computer 90, and so forth).

Thus, the reading apparatus 10 according to this embodiment includes the image pickup unit 20 including the light source 21 and the image pickup element 23 movable to the positions P1, P2, P3, P4, P5 at each of which the image pickup element 23 is oriented at a different angle with respect to the surface to be read of the source material S. The reading apparatus 10 can read the source material S with the image pickup element 23 at the plurality of angles, by driving the image pickup elements 23 while shifting the relative positional relationship between the image pickup unit 20 and the source material S. Such a configuration allows the light reflected at different angles by the source material S to be received by the image pickup element 23 at the plurality of orientations (angles), thereby enabling information necessary for accurately reading the source material S to be properly acquired.

In particular, by the reading method that employs the image pickup element mounted at a fixed angle, it is difficult to decide whether the source material S includes a region that presents a glossy appearance or metallic texture, or which region of the source material S is presenting a glossy appearance or metallic texture. According to this embodiment, however, the foregoing decision can be made by reading the source material S with the image pickup element 23 at each of the plurality of positions P1, P2, P3, P4, P5 corresponding to the different angles with respect to the source material S, and comparing the respective reading results. On the basis of the decision thus made, the information of the glossy appearance or metallic texture (property information) can be added to the read image data outputted by the reading control unit 40a at the step S230. Accordingly, in the case of printing the read image data bearing the property information at a subsequent stage, for example a clear ink may be employed for a region corresponding to the property information of "gloss" and a metallic ink may be employed for a region corresponding to the property information of "especial gloss", so that the texture equivalent to that of the source material S that has been read can be precisely reproduced in a copied material. In addition, in the case of displaying an image based on the read image data bearing the property information on a predetermined display device, an appropriate image processing (data processing) may be performed on the region corresponding to the property information of "gloss" or "especial gloss", to thereby express the equivalent texture to that of the source material S that has been read on the display device.

3. Variations

The invention is in no way limited to the foregoing embodiment, but may be modified in various manners within the scope and spirit of the invention. To cite a few examples, the following variations may be adopted. Combinations of the foregoing embodiment and one or more of the following variations are also included in the scope of the invention.

Variation 1

In the foregoing reading control process, a predetermined warning may be outputted in the case where a difference between the read values exceeds a predetermined amount as a result of comparison of the read values acquired at the plurality of positions (angles). For example, the decision unit 40b may decide that the source material is not presenting an ordinary image, in the case where a difference between the read values (difference between the maximum value and the minimum value among the read values of the plurality of angles) exceeds the predetermined numerical range as a result of comparison of the read image data acquired by the image pickup element 23 at the plurality of angles by pixels, and comparison of the read values of each angle with respect to a subject pixel. The "ordinary image" herein refers to a non-glossy image, from which the hue can be accurately read irrespective of the angle of the image pickup element 23. Pixels presenting a glossy appearance or metallic texture are not decided to be an ordinary image. The decision unit 40b causes the warning unit 40d to output a warning in the case where the image on the source material is not an ordinary image. The warning unit 40d displays a predetermined warning message on the display unit 81 of the operation panel 80 or the display of the computer 90. For example, the warning unit 40d displays a message to the effect that the source material S being read fails (or may fail) to be properly read.

Such a configuration allows the user to decide whether to cancel the scanning of the source material S to be read, in view of the warning message displayed. For example, the user can press either a "continue" button or a "cancel" button displayed together with the warning message on the display unit 81 (or the display of the computer 90), to thereby instruct whether to continue or cancel the scanning. If "continue" is selected the step S210 and the subsequent process is performed, and if "cancel" is selected the process shown in FIG. 3 is aborted at this time point.

Variation 2

The region where the property of the image decided at the step S210 is to be stored is not limited to the alpha channel. For example, the decision unit 40b may convert the read image data to which the property information is to be added into an image file of JPEG format, and record the property information of each pixel in the information region of the image file, called a maker note.

Variation 3

In the foregoing passages, the reading operation of the image pickup element 23 at the plurality of positions P1, P2, P3, P4, P5 for reading the entire region of the source material S has been described. However, it requires considerable time and arithmetic processing to move the image pickup element 23 to the plurality of positions P1, P2, P3, P4, P5 and read the source material S at each of those positions. Accordingly, the reading apparatus 10 may be configured so as to execute prescanning and regular scanning of the source material S, and in the prescanning the reading apparatus may read the source material S with the image pickup element 23 at one of the plurality of positions P1, P2, P3, P4, P5 to thereby decide whether to read the source material S at all of the plurality of positions P1, P2, P3, P4, P5 on the basis of a reading result obtained at the one of the positions, and in the regular scanning the reading apparatus may read the source material S with the image pickup element 23 at all of the plurality of positions only when it is decided to be necessary to read at all of the plurality of positions, and may read the source material S with the image pickup element 23 at one of the plurality of positions P1, P2, P3, P4, P5 in the case where it is not decided to read at all of the plurality of positions.

Figure 6:
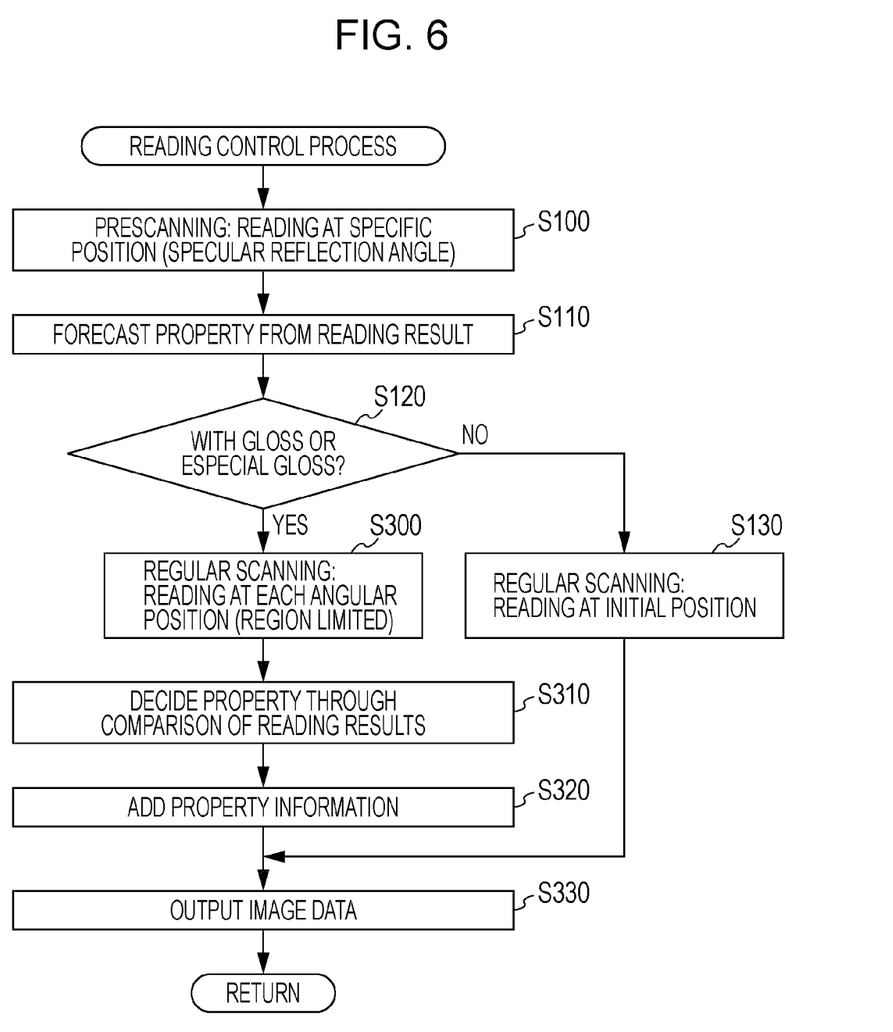
FIG. 6 is a flowchart showing a process according to a variation.

FIG. 6 is a flowchart showing a process according to the variation 3. At a step S100, the reading control unit 40a controls the image pickup unit 20 and the drive mechanism 30 so as to cause the drive mechanism 30 move the image pickup element 23 and the image pickup unit 20, to thereby perform the prescanning by causing the image pickup element 23 to read the source material S at the specific position (specular reflection angle). In other words, the position of the image pickup element 23 is limited to the specific position among the plurality of positions P1, P2, P3, P4, P5 at which the image pickup element 23 can be located, for scanning the source material table G. Through the prescanning, the position and size of the source material S on the source material table G (the area to be read by the regular scanning), as well as the read image data of the source material S (prescanned data) can be obtained.

At a step S110, the decision unit 40b forecasts the property of the image ion the source material S on the basis of the prescanned data. More specifically, the decision unit 40b forecasts that the image includes a region presenting the gloss or especial gloss, in the case where the read values of the pixels contained in the prescanned data include a read value greater than a predetermined threshold. As stated above, the property of the image can be accurately decided through the comparison of the read image data acquired by the image pickup element 23 at the plurality of positions. Accordingly, the forecast made at the step S110 is not intended for accurate decision, and hence the threshold is set at a relatively low level so that it can be decided that the image includes a region presenting the gloss or especial gloss when the image is likely to include such a region at all. However, the image pickup element 23 may read the source material S at the specific position and the initial position (position P1) through the prescanning at the step 100, so as to improve the accuracy of the forecast made at the step S110.

In this case, comparing at the step S110 the prescanned data obtained at the specific position and the prescanned data obtained at the initial position improves the accuracy of the forecast, compared with the case of forecasting solely on the basis of the prescanned data of the specific position. More specifically, the decision unit 40b may compare the read values of the respective prescanned data corresponding to the same pixel, to thereby forecast that the image includes a region presenting the gloss or especial gloss in the case where a pixel is present that gives a read value at the specific position higher by a predetermined amount than a read value at the initial position.

At a step S120, the decision unit 40b performs different operations depending on the forecast made at the step S110. Specifically, the decision unit 40b proceeds to a step S300 in the case where it is forecasted that the image includes a region presenting the gloss or especial gloss at the step S110, and proceeds to a step S310 in the case where it is forecasted that the image does not include a region presenting the gloss or especial gloss. At the step S300, the reading control unit 40a controls the image pickup unit 20 and the drive mechanism 30 so as to cause the drive mechanism 30 to move the image pickup element 23 and the image pickup unit 20, and perform the regular scanning by causing the image pickup element 23 to read the source material S at the plurality of positions P1, P2, P3, P4, P5. However, the image pickup element 23 is not made to read the entirety of the source material S at the plurality of positions (angles), but it is only the region that has been forecasted to be presenting the gloss or especial gloss at the step S110 that the image pickup element 23 is made to read at the plurality of positions (angles).

Figure 7:
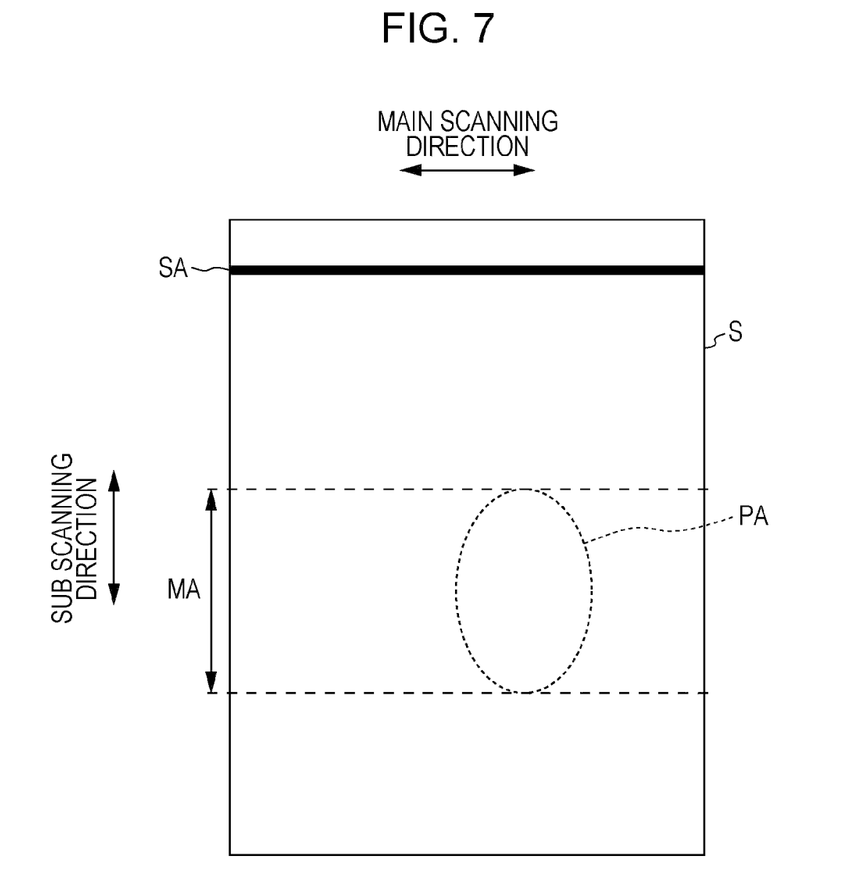
FIG. 7 is a diagram for explaining how a source material is read in a regular scanning operation.

FIG. 7 is a diagram for explaining how the source material S is read in the regular scanning. In FIG. 7, a partial region of the source material S surrounded by broken lines represents the region that has been forecasted to be presenting the gloss or especial gloss at the step S110 (forecasted region PA). Also, the reading region SA extending in the main scanning direction is represented by a solid line. The reading range SA is a range to be read at a time by the image pickup element 23 constituted of a linear sensor (or a range to be read by the image pickup element 23 by one main scanning action, in the case where the image pickup unit 20 of a reduced size is set to reciprocate in the main scanning direction), which corresponds to the aforementioned "one line". The relative positional relationship between the reading range SA and the source material S in the sub scanning direction is shifted by moving either the image pickup unit 20 or the source material S in the sub scanning direction.

At the step S300, the reading control unit 40a identifies the range in the sub scanning direction corresponding to the forecasted region PA, and causes the image pickup element 23 to read the source material S at the plurality of positions P1, P2, P3, P4, P5, with respect to only the identified range (range MA in FIG. 7). For the region of the source material S other than the identified range (MA), the reading control unit 40a causes the image pickup element 23 to read only at the initial position. The steps S310 and S320 are generally the same as the steps S210 and S220 (see FIG. 3). However, the decision unit 40b decides the property through comparison of the read values obtained at each of the plurality of angles (plurality of positions P1, P2, P3, P4, P5) at the step S300, with respect to the pixels located in the range MA and also corresponding to the forecasted region PA (step S310). Then the decision unit 40b records the property information decided at the step S310, with respect to each pixel corresponding to the forecasted region PA among the pixels of the read image data to which the property information is to be added (step S320). However, since a pixel may be present that is not decided to have the property of "gloss" nor "especial gloss" at the step S310 despite being located in the forecasted region PA, the property information is not recorded with respect to all the pixels in the forecasted region PA.

In the read image data bearing the property information added at the step S320, further, the RGB values acquired by the reading at the initial position are adopted as the information for the RGB channels with respect to the pixels other than those having the property of "especial gloss", and the RGB values representing the highest chroma among those obtained by reading at the positions P1, P2, P3, P4, P5 are adopted as the information for the RGB channels with respect to the pixels having the property of "especial gloss". At the step S130, since the source material S does not have the forecasted region PA, the reading control unit 40a causes the image pickup element 23 to perform the ordinary scanning of the source material S (to read only at the initial position). At the step S330, the reading control unit 40a outputs, as at the step S230 (see FIG. 3), the read image data (bearing the property information) acquired through the operation of the step S320 or the step S130. With the foregoing arrangement according to the variation 3, it can be forecasted, by the prescanning with the image pickup element 23 at just one (specific position) or two positions (specific position and initial position), whether the source material S contains a region where the property should be decided by reading at additional positions, and the reading at the additional positions (plurality of positions P1, P2, P3, P4, P5) is performed only with respect to the region where the property should be decided by reading at the additional positions. Such an arrangement minimizes an increase in processing time and in amount of processing jobs originating from moving the image pickup element 23 to the plurality of positions for reading.

Variation 4

A plurality of image pickup elements 23 may be provided in the image pickup unit 20, and the drive mechanism 30 may move each of the plurality of image pickup elements 23. For example, the image pickup unit 20 may include an image pickup element 23 movable in a predetermined range in the plurality of positions P1, P2, P3, P4, P5 (for example, positions from P1 to P3), and another image pickup element 23 movable in the remaining range of the positions P1, P2, P3, P4, P5 (for example, positions from P4 to P5).

Variation 5

The "ink" herein referred to is not limited to a liquid ink, but more broadly encompasses a toner employed in a laser printer. Other terms encompassed in the "ink" in its broader sense include "coloring material", "coloring agent", and "colorant".

What is claimed is:

1. A reading apparatus comprising:
    a light source that emits a light to an object to be read; and
    an image pickup element that receives the light reflected by the object to be read, to thereby read the object to be read,
    wherein the image pickup element is disposed so as to move to a plurality of positions at each of which the image pickup element is oriented at a different angle with respect to a surface to be read of the object to be read, and to perform reading at the plurality of positions;
    wherein the reading apparatus further comprises a decision unit that compares read values obtained by the image pickup element at the plurality of positions to thereby decide a property of an image expressed on the object to be read.

2. The reading apparatus according to claim 1, wherein the decision unit decides the property of the image with respect to each of partial regions of the image.

3. The reading apparatus according to claim 1, wherein the decision unit adds information indicating a result of the decision to the image data generated by the image pickup element upon reading the object to be read.

4. The reading apparatus according to claim 1, wherein the decision unit decides that the image is presenting a glossy appearance in the case where a read value acquired from the image pickup element at a specific position corresponding to a specific angle among the plurality of positions is prominently higher than read values of the positions other than the specific position, and a difference between the read values of the positions other than the specific position is within a predetermined range.

5. The reading apparatus according to claim 1, wherein the decision unit decides that the image is presenting a metallic texture in the case where a read value acquired from the image pickup element at a specific position corresponding to a specific angle among the plurality of positions is prominently higher than read values of the positions other than the specific position, and the read values of the positions other than the specific position vary in a predetermined variation pattern.

6. A reading apparatus comprising:
    a light source that emits a light to an object to be read; and
    an image pickup element that receives the light reflected by the object to be read, to thereby read the object to be read,
    wherein the image pickup element is disposed so as to move to a plurality of positions at each of which the image pickup element is oriented at a different angle with respect to a surface to be read of the object to be read, and to perform reading at the plurality of positions, and
    wherein the reading apparatus is configured so as to execute prescanning and regular scanning of the object to be read, wherein the prescanning includes reading the object to be read with the image pickup element at one or more positions among the plurality of positions, to thereby decide whether to read the object to be read at all of the plurality of positions on the basis of a reading result obtained at the one or more positions; and the regular scanning includes reading the object to be read with the image pickup element at all of the plurality of positions in the case where it is decided to read the object to be read at all of the plurality of positions, and reading the object to be read with the image pickup element at one of the plurality of positions in the case where it is not decided to read the object to be read at all of the plurality of positions.

7. A reading method to be performed by a reading apparatus that includes a light source that emits a light to an object to be read and an image pickup element that receives the light reflected by the object to be read to thereby read the object to be read,
    the method comprising causing the image pickup element to move to a plurality of positions at each of which the image pickup element is oriented at a different angle with respect to a surface to be read of the object to be read, causing the image pickup element to read the object to be read at the plurality of positions, and comparing read values obtained by the image pickup element at the plurality of positions to thereby decide a property of an image expressed on the object to be read.

* * * * *